Jan. 21, 1936.  B. KOSVICH  2,028,612
BIRD CAGE SEED GUARD FRAME
Filed April 25, 1935
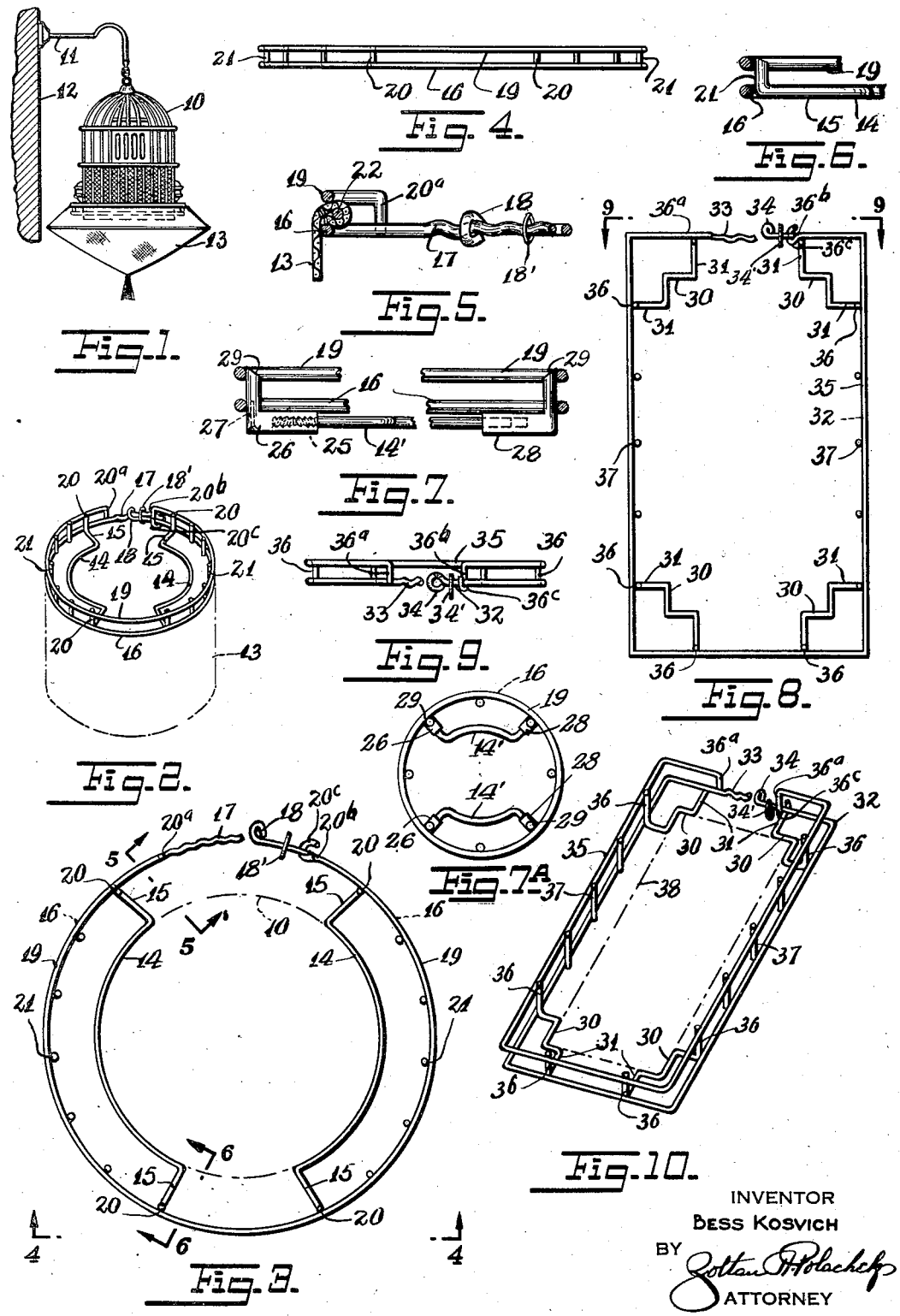
INVENTOR
BESS KOSVICH
BY
ATTORNEY Patented Jan. 21, 1936

2,028,612

UNITED STATES PATENT OFFICE 2,028,612

BIRD CAGE SEED GUARD FRAME

Bess Kosvich, New York, N. Y.

Application April 25, 1935, Serial No. 18,152

7 Claims. (Cl. 119—17)

This invention relates to new and useful improvements in a bird cage seed guard frame.

The invention has for an object the construction of a guard frame adapted to be readily attached upon the bottom of a bird's cage for the purpose of catching and holding the seeds dropped out of the cage by the bird.

Still further the invention proposes a novel construction of the guard frame so that it may be readily attached to and detached from the bird's cage.

Still further it is proposed to so arrange the guard frame so as to extend slightly away from the base of the bird's cage so as to catch seeds falling slightly away from the cage.

As another object of this invention it is proposed to construct the bird cage guard of two main portions, one of these portions constituting a frame for attachment upon the bottom of the bird's cage, and the other a detachable bag engaging upon said frame.

As another object of this invention it is proposed to construct the frame of the guard with several elements for engaging against the sides of the bird's cage and having outward extended ends, and to arrange other parts upon these outward extended ends in a manner so that the guard may be clamped upon the cage and furthermore provide a satisfactory mounting for the attachment of the bag upon the guard.

Still further the invention proposes the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a side elevational view of a bird cage with a guard according to this invention.

Fig. 2 is a perspective view of the frame portion of the guard per se.

Fig. 3 is a plan view of Fig. 2.

Fig. 4 is a side elevational view of Fig. 3.

Fig. 5 is a sectional view taken on the line 5—5 of Fig. 3, but also showing a portion of the bag.

Fig. 6 is a sectional view taken on the line 6—6 of Fig. 3.

Fig. 7 is a side elevational view, with parts broken away, of a modification of the invention.

Fig. 7a is a plan view of the article shown in Fig. 7.

Fig. 8 is a plan view of the frame portion of a guard constructed according to another modification of the invention.

Fig. 9 is an end elevational view as though looking in the direction of the line 9—9 of Fig. 8.

Fig. 10 is a perspective view of the frame shown in Figs. 8 and 9.

The guard according to this invention is adapted to be attached upon a bird cage 10 which is shown supported by an arm 11 attached upon the wall 12 or other support element. The bird cage guard comprises a frame portion as illustrated in Fig. 2 and a bag portion 13 adapted to be attached upon the frame portion. The frame portion comprises several elements 14 for engaging the sides of the bird cage and having outward extending ends 15.

A band 16 with free ends 17 and 18 is attached upon the outward extending ends 15, preferably by solder, and is adapted to have the free ends 17 and 18 engaged together for clamping the several elements 14 upon the sides of the bird cage. The end 18 is in the form of a hook while the end 17 is of wavy construction and adapted to be engaged through the hook and twisted to maintain the clamped position. A member 19 (in the form of a wire) is vertically spaced from the band 16 and extends over all portions of the band 16 except the free ends 17 and 18. Several spaced supports and bent ends 20ª and 20ᵇ from the member 19 hold the member 19 relative to the band 16. Certain of these supports comprise continuations 20 bent upwards from the extending ends 15 and attached upon the band 16 and the member 19 (preferably by solder). Other of these supports comprise strips 21 vertically extended between the band 16 and the member 19 and soldered in place. The extremity of bent end 20ᵇ is formed with a loop 20ᶜ to insure the clamping of the wavy free end 17 in hook 18, at any desired distance. A movable ring 18' is also provided adjacent to loop 18 to aid the clamping of the end portions 17 and 18 of the frame.

The bag 13 has a top hem in which an elastic or other cord 22 is engaged in a manner so that the open top end of the bag may be contracted. The top end of the bag is adapted to be engaged between the band 16 and the member 19 and then the elastic 22 allowed to operate, or the top of the band contracted in any other manner so as to grip upon the spaced supports which hold the member 19 in relation to the band 16. Obviously certain portions of the contracted top of the bag will extend between the band 16 and the member 19, and so serve to hold the bag firmly in position.

The dot and dash lines 10 in Fig. 3 indicate the lower portion of the bird cage. This illustration shows the manner in which the several elements 14 engage against the side. It should be noted particularly that a space exists between the outer periphery of the cage 10 and the member 19 and the band 16 so that the seed may drop in between this space and into the bag 13. Expressed differently the upper open end of the bag is held spaced from the bird cage so that the seeds may fall through this spacing into the bag.

In Figs. 7 and 7ᵃ a slightly modified form of the invention has been disclosed in which the several elements for engaging against the sides of the bird cage are detachably mounted to be removable and replaceable to adapt the guard for bird cages of slightly different sizes and shapes. Reference numeral 14' indicates one of the elements for engaging against the sides of the bird cage and is shown having a mounted end 25 threadedly engaging through a tubular element 26 pivotally mounted by a screw 27 upon the lower end of one of the spaced supports 29 which holds the band 16 and the member 19 in relatively spaced positions. The outer end of the element 14' slidably engages into the tubular portion 28 of a bracket having a vertical portion 29 constituting one of the supports for holding the band 16 and the member 19 in proper vertically spaced relation.

The element 14' may be removed and replaced by first bending the element 14' (this element should be flexible so that it may be bent without damage) sufficiently to disengage the end which slidably engages into the tubular portion 28. Then the tubular member 26 may be swiveled so that the member 14' extends outside of the guard. Then the member 14' may be rotated to threadedly disengage from the tubular member 26.

In Figs. 8–10 inclusive another embodiment of the invention has been disclosed in which the frame portion of the guard is shown of substantially rectangular shape so as to fit a rectangular bird cage. This frame comprises several elements 30 for engaging against the corners of a bird cage and having outward extended ends 31. The several elements 30 are shaped so as to simulate a corner and so be capable of fitting against the outside corners of the bird cage. The band 32 with free ends 33 and 34 is attached preferably by solder upon the outward extending ends 31 and is adapted to have the said free ends 33 and 34 engage together for clamping the several elements 30 upon the corners of the bird cage. The end 33 is adapted to engage through an end 34 which is in the form of a hook for the purpose of clamping these ends together. A member 35 is vertically spaced from the band 32 and extends over all portions except the free ends 33 and 34. Spaced supports are arranged between the member 35 and the band 32 for holding these parts relatively spaced and comprises continuations 36 from certain of the ends 31 extending between the band 32 and the member 35 and bent ends 36ᵃ and 36ᵇ on the member 35 soldered on the band 32. These spaced supports also comprise vertical strips 37 merely extended between the band 32 and the member 35. A movable ring 34' adjacent the free end 34 and a second hook 36ᶜ are also provided, extending from bent end 36ᵇ through which the wavy end 33 of band 32 is inserted to insure locking action between free ends 33 and 34.

The dot and dash lines 38 in Fig. 10 schematically indicate the size of a bird cage so that the manner in which the elements 30 may engage the corners thereof may be understood. The bag 13 may be engaged upon the frame illustrated in Figs. 8–10 by causing the upper edge to engage in between the band 32 and the member 35 in a manner so that the band in the hem at the top of the bag engages against the spaced supports 36 and 37 and other portions of the bag are extended between the spaced supports to maintain the bag in place upon the frame.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A bird cage seed guard, comprising several elements for engaging against the sides of a bird cage and having outward extending ends, a band with free ends attached upon said outward extending ends and adapted to have said free ends engaged together for clamping said several elements upon the sides of a bird cage, a member vertically spaced from said band and extending over all portions except the free ends of said band, spaced supports between said member and band, and a bag having its open top end between said member and band and attached upon said spaced supports.

2. A bird cage seed guard, comprising several elements for engaging against the sides of a bird cage and having outward extending ends, a band with free ends attached upon said outward extending ends and adapted to have said free ends engaged together for clamping said several elements upon the sides of a bird cage, a member vertically spaced from said band and extending over all portions except the free ends of said band, spaced supports between said member and band, and a bag having its open top end between said member and band and attached upon said spaced supports, the free ends of said band comprising respectively a hook and a wavy portion engageable through said hook for clamping the ends together, and a second hook on said band for insuring the clamping action of the said free ends.

3. A bird cage seed guard, comprising several elements for engaging against the sides of a bird cage and having outward extending ends, a band with free ends attached upon said outward extending ends and adapted to have said free ends engaged together for clamping said several elements upon the sides of a bird cage, a member vertically spaced from said band and extending over all portions except the free ends of said band, spaced supports between said member and band, and a bag having its open top end between said member and band and attached upon said spaced supports, certain of said spaced supports comprising continuation from the extending ends of said several elements.

4. A bird cage seed guard, comprising several elements for engaging against the sides of a bird cage and having outward extending ends, a band with free ends attached upon said outward extending ends and adapted to have said free ends engaged together for clamping said several elements upon the sides of a bird cage, a member vertically spaced from said band and extending over all portions except the free ends of said band, spaced supports between said member and band, and a bag having its open top end between said member and band and attached upon said spaced supports, said bag having a cord mounted upon the top edge thereof for contracting the top edge upon said spaced supports.

5. A bird cage seed guard, comprising several elements for engaging against the sides of a bird cage and having outward extending ends, a band with free ends attached upon said outward extending ends and adapted to have said free ends engaged together for clamping said several elements upon the sides of a bird cage, a member vertically spaced from said band and extending over all portions except the free ends of said band, spaced supports between said member and band, and a bag having its open top end between said member and band and attached upon said spaced supports, said bag having a cord mounted upon the top edge thereof for contracting the top edge upon said spaced supports, said cord being of elastic.

6. A bird cage seed guard, comprising a band with free ends, a member vertically spaced from said band and extending over all portions except said free ends, spaced supports between said member and band, tubular elements swiveled upon certain of said spaced supports, other tubular elements fixed upon the other of said spaced supports, and several elements for engaging against the sides of the bird cage and having one of their ends threadedly engaging said swiveled tubular members and slidably engaging the other of said tubular members, and a bag having its open top end between said member and band and attached on said spaced supports.

7. A bird cage seed guard, comprising several elements for engaging against the sides of a bird cage and having outward extending ends, a band with free ends attached upon said outward extending ends and adapted to have said free ends engaged together for clamping said several elements upon the sides of a bird cage, a member vertically spaced from said band and extending over all portions except the free ends of said band, spaced supports between said member and band, and a bag having its open top end between said member and band and attached upon said spaced supports, said several elements being shaped for engaging the corners of a bird cage.

BESS KOSVICH.